(12) United States Patent
Beck et al.

(10) Patent No.: US 11,729,627 B2
(45) Date of Patent: Aug. 15, 2023

(54) ADJUSTING COVERAGE AREA OF A RADIO USING SHARED SPECTRUM TO REDUCE INTERFERENCE TO OTHER USERS OF THE SHARED SPECTRUM

(71) Applicant: CommScope Technologies LLC, Hickory, NC (US)

(72) Inventors: Andrew E. Beck, Ashburn, VA (US); Sammit Patel, Dallas, TX (US); Shirley M. Forsythe, Sachse, TX (US)

(73) Assignee: CommScope Technologies LLC, Hickory, NC (US)

( * ) Notice: Subject to any disclaimer, the term of this patent is extended or adjusted under 35 U.S.C. 154(b) by 211 days.

(21) Appl. No.: 17/365,522

(22) Filed: Jul. 1, 2021

(65) Prior Publication Data
US 2022/0038914 A1    Feb. 3, 2022

Related U.S. Application Data

(60) Provisional application No. 63/060,419, filed on Aug. 3, 2020.

(51) Int. Cl.
| *H04W 16/14* | (2009.01) |
| *H04W 12/06* | (2021.01) |
| *H04W 52/28* | (2009.01) |
| *H04W 52/24* | (2009.01) |
| *H04W 52/14* | (2009.01) |

(52) U.S. Cl.
CPC ........... *H04W 16/14* (2013.01); *H04W 12/06* (2013.01); *H04W 52/146* (2013.01); *H04W 52/244* (2013.01); *H04W 52/281* (2013.01)

(58) Field of Classification Search
CPC ... H04W 16/14; H04W 12/06; H04W 52/146; H04W 52/244; H04W 52/281
USPC .......................................... 370/310, 328, 329
See application file for complete search history.

(56) References Cited

U.S. PATENT DOCUMENTS

| 8,018,390 | B2 | 9/2011 | Davidson et al. |
| 8,085,211 | B2 | 12/2011 | Yang et al. |
| 10,116,425 | B2 | 10/2018 | Zimmerman |
| 2015/0223069 | A1* | 8/2015 | Solondz ................ H04W 12/08 370/329 |

(Continued)

FOREIGN PATENT DOCUMENTS

| KR | 1020190117649 A | 10/2019 |
| KR | 1020200066961 A | 6/2020 |
| WO | 2020141948 A1 | 7/2020 |

OTHER PUBLICATIONS

International Searching Authority, "International Search Report and Written Opinion from PCT Application No. PCT/US2021/040124", from Foreign Counterpart to U.S. Appl. No. 17/365,522, filed Oct. 20, 2021, pp. 1 through 9, Published: WO.

(Continued)

*Primary Examiner* — Obaidul Huq
(74) *Attorney, Agent, or Firm* — Fogg & Powers LLC (57) ABSTRACT

Techniques for optimizing antenna parameters of a radio configured to transmit on spectrum shared by incumbent user(s) are disclosed. The incumbent user has priority to use the shared spectrum over the radio. The antenna parameters are optimized to reduce interference to incumbent user(s) and/or other radios utilizing the shared spectrum whilst maintaining satisfactory coverage area.

20 Claims, 4 Drawing Sheets

(56) References Cited

U.S. PATENT DOCUMENTS

| | | |
|---|---|---|
| 2017/0295497 A1 | 10/2017 | Macmullan et al. |
| 2018/0279316 A1 | 9/2018 | Mueck et al. |
| 2020/0029222 A1 | 1/2020 | Mueck et al. |
| 2020/0120615 A1* | 4/2020 | Kalenahalli ............ H04W 16/14 |
| 2020/0187214 A1* | 6/2020 | Olfat ....................... H04L 67/12 |

OTHER PUBLICATIONS

AISG, "Antenna Interface Standards Group Base Standard AISG v3.0", Base Standard AISG v3.0 v3.0.2.1 Revision History, Jun. 11, 2019, pp. 1 through 202, Antenna Interface Standards Group, AISG ltd.

* cited by examiner

ADJUSTING COVERAGE AREA OF A RADIO USING SHARED SPECTRUM TO REDUCE INTERFERENCE TO OTHER USERS OF THE SHARED SPECTRUM

CROSS-REFERENCE TO RELATED APPLICATIONS

The present application claims benefit of U.S. Patent Application Ser. No. 63/060,419, filed Aug. 3, 2020; the entire contents of the aforementioned patent application are incorporated herein by reference as if set forth in its entirety.

BACKGROUND

A citizens broadband radio service (CBRS) includes incumbent users of shared spectrum and secondary users of shared spectrum. An incumbent user may also be referred to as a primary user. Incumbent users have priority access to transmit in the spectrum shared with the secondary users. If a secondary user seeks permission to transmit on spectrum shared by incumbent user(s) and/or other secondary user(s), it will only be permitted to do so to the extent its transmissions do not raise aggregate interference at the incumbent user(s) and/or other secondary user(s) above corresponding threshold levels for each of such incumbent user(s) and secondary user(s).

Such secondary users use citizen broadband radio service device(s) (CBSD(s)). A CBSD is a radio including a transmitter coupled to an antenna, e.g., an access point or base station. A CBRS includes a spectrum access system (SAS) which regulates the transmissions of CBSD(s) in shared spectrum under the SAS's control, e.g., whether each CBSD of a SAS can transmit in the shared spectrum, and if so then at what power level.

Maintaining the interference at or below a threshold level at locations of incumbent user(s) and/or secondary user(s) is conventionally achieved by the SAS denying a secondary user's request to transmit in shared spectra or by authorizing the secondary user to transmit at a diminished output power. However, this can significantly reduce coverage area of a CBSD, and thus the number of user equipment which can utilize the CBSD.

SUMMARY OF THE INVENTION

A method is provided. The method comprises: receiving a request from a radio to utilize spectrum shared with at least one higher priority user, where the at least one higher priority user has priority to receive in the shared spectrum over the requesting radio to transmit in the shared spectrum; identifying at least one higher priority user having a region of interest within which the requesting radio is located; determining a first aggregate interference power, or power spectral density, level at each identified higher priority user, wherein the first aggregate interference power, or power spectral density, level comprises a sum of interference power, or power spectral density, levels at a corresponding identified higher priority user from the requesting radio and any other radio authorized to transmit in the shared spectrum within the region of interest of the corresponding identified higher priority user; determining if the first aggregate interference power, or power spectral density, level, at any identified higher priority user, exceeds a corresponding interference threshold level; upon determining that the first aggregate interference power, or power spectral density, level at any identified higher priority user exceeds the corresponding interference threshold level, then seeking a value of at least one adjustable antenna parameter of the requesting radio so that a reduced coverage area of the requesting radio includes at least one of: (a) a number of user equipment configured to communicate with the radio that is greater than a user equipment threshold level, and (b) at least one specific area, while a corresponding other aggregate interference power, or power spectral density, level, at any identified higher priority user, does not exceed a corresponding interference threshold level, wherein the other aggregate interference power, or power spectral density, level comprises a sum of interference power, or power spectral density, levels at a corresponding identified higher priority user from the requesting radio and any other radio authorized to transmit in the shared spectrum and within the region of interest of the corresponding identified higher priority user, and wherein the coverage area is an electromagnetic radiation pattern of the requesting radio which has a power, or power spectral density, level at or above a level that is a minimum detectable level of a receiver of an user equipment; and upon finding the sought value of at least one adjustable antenna parameter of the requesting radio, then transmitting to the requesting radio an authorization to transmit in the shared spectrum and the found sought value of the at least one adjusted adjustable antenna parameter.

DRAWINGS

Comprehension of embodiments of the invention is facilitated by reading the following detailed description in conjunction with the annexed drawings, in which.

DETAILED DESCRIPTION

Techniques are provided for reducing interference from a requesting secondary user at higher priority user(s) and/or other secondary user(s) without having to significantly diminish a number of user equipment capable of communicating with or configured to communicate with the requesting secondary user. This can be achieved by adjusting adjustable antenna parameter(s) of one or more antennas (antenna(s)) of the requesting secondary user in addition to or in lieu of adjusting transmitter output power of the requesting secondary user. The requesting secondary user is a user requesting to transmit in shared spectrum controlled by a SAS and shared with higher priority user(s) and/or other secondary user(s) whose transmission(s) are controlled by the SAS. The SAS must authorize the requesting user to transmit in the spectrum shared with higher priority user(s) and/or the other secondary user(s) controlled by the SAS. By allowing adjustment of the adjustable antenna parameter(s) in addition to or in lieu of adjusting requesting secondary user's transmit power, embodiments of the invention provides greater degree(s) of freedom to diminish interference at the location(s) of other secondary user(s) controlled by the SAS and/or higher priority users while ensuring that a number of user equipment that can utilize the requesting secondary user is not significantly reduced.

A secondary user may be referred to as a CBSD, or more generally as a radio, herein. Thus, a requesting secondary user may be referred to as a requesting CBSD or a requesting radio. Secondary user(s) may be referred to herein as CBSD(s) or radio(s).

The techniques may be used to reduce the interference caused by a requesting CBSD at location(s) of higher priority users and/or other CBSD(s) so that an aggregate interference at such location(s) is at or below corresponding interference threshold level(s). As a result, a SAS controlling the requesting CBSD would permit the CBSD to transmit in the shared spectrum. Thus, a greater number of CBSD(s) in a given geographic region, controlled by the SAS, can operate (e.g., transmit) in the shared spectrum while not significantly reducing a number of user equipment capable of or configured to use such CBSD(s). As a result, more such user equipment can utilize the CBSD(s) controlled by the SAS and authorized to transmit in the shared spectrum.

Not significantly reduce means that a number of user equipment, in a reduced coverage area, capable of communicating or configured to communicate with the CBSD is greater than an user equipment threshold level, and/or that specific area(s) in the original coverage area of the CBSD are included in the reduced coverage area. The original coverage area means a coverage area based upon a highest transmit power of a CBSD or a transmit power of the CBSD requested for use from the SAS. Specific area means an area that must be included in a coverage area of a radio. Such specific areas may be areas with a higher density of user equipment, e.g., urban and/or suburban areas, in comparison to other areas, e.g., rural, desert, and/or water areas. The user equipment threshold level may be defined by a user and/or a system, such as the SAS. User equipment threshold level means a number of user equipment in a coverage area.

Figure 1A:
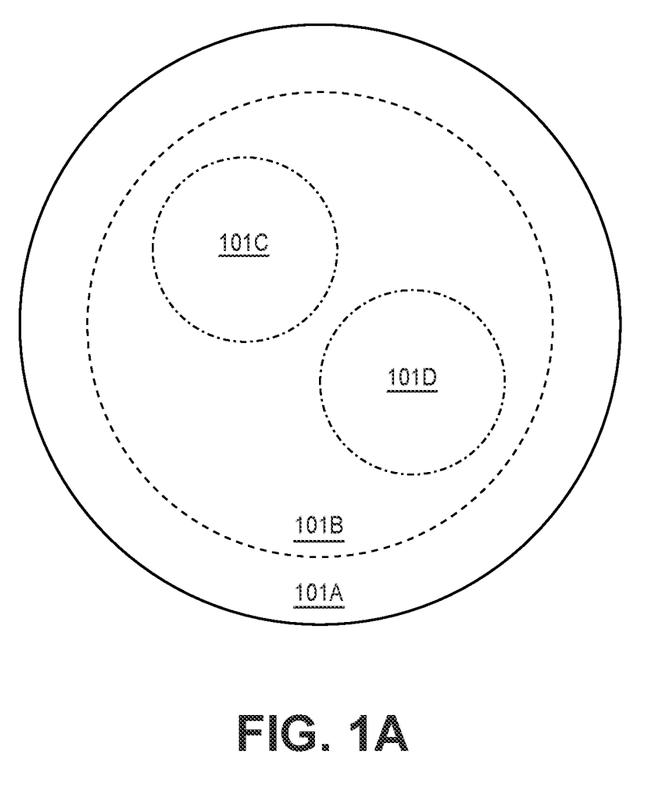
FIG. 1A illustrates a diagram of one embodiment of a reduced coverage area of a CBSD encompassing urban and suburban regions having high user equipment density.

FIG. 1A illustrates a diagram of one embodiment of a reduced coverage area of a CBSD encompassing urban and suburban regions having high user equipment density. An original coverage area 101A encompasses a reduced coverage area 101B, an urban region 101C, and a suburban region 101D. Reduced coverage area means a coverage area whose area is smaller than an original coverage area, or a maximum coverage area, due to changes to at least one antenna parameter of a radio, and optionally due also to diminishing radio transmit power. The illustrated reduced coverage area 101B is an area that still encompasses the urban region 101C and the suburban region 101D. The original coverage area 101A is determined by modelling (discussed elsewhere herein), e.g., with an initial transmit power (and possibly other parameter(s)) of a requesting CBSD; optionally, the initial transmit power may be a maximum transmit power of the requesting CBSD or a transmit power (less than the maximum power of the CBSD) requested of the SAS by the requesting CBSD. The reduced coverage area 101B is determined as discussed elsewhere herein.

The user equipment capable of or configured to communicate with a CBSD in an area may be an estimate. Optionally, the estimated user equipment capable of or configured to communicate with a CBSD may be based upon geographic morpholog(ies) (e.g., urban, suburban, rural, desert, and/or water morphologies) in a coverage area. Each geographic morphology may have a corresponding estimated user equipment density, e.g., corresponding density of people residing or working in the geographic morphology. For example, densities of user equipment capable of communicating or configured to communicate with a CBSD in urban and suburban morphology types would be higher than such user equipment densities in rural, desert, and water morphology types. Optionally, a desert region or water region may have a user equipment density of zero. The estimated user equipment densities for each geographic morphology type may be defined by a user, the SAS, and/or another entity. Thus, for example, a reduced coverage area could be deemed not to be significantly diminished when regions of geographic morphologies of relatively low density of user equipment are excluded from the reduced coverage area; an optional exception to the foregoing would be if the specific region(s) of low user equipment density are mandated to be included in the reduced coverage area.

A coverage area means an electromagnetic radiation pattern of antenna(s) of a CBSD (or a radio) which has a power or power spectral density level (when a transmitter of the CBSD (or the radio) is transmitting) that is at or above a level that is a minimum detectable power level of receivers of user equipment capable of communicating or configured to communicate with the CBSD (or the radio). A coverage area may also be described as an electromagnetic radiation pattern of a CBSD or a radio; CBSD and radio as used herein includes antenna(s). The term power spectral density may be used in lieu of power herein. Coverage area may be generated using a propagation model and parameters of the CBSD, e.g. transmit frequency and antenna height. The propagation model type may be selected based upon CBSD transmit frequency and geographic morpholog(ies) of the coverage area. Illustrative examples of propagation models include a free space propagation model, a Hata model, a modified Hata model, and an irregular terrain model.

The coverage area can be manipulated by adjusting output power of the transmitter of a CBSD and/or at least one adjustable antenna parameter of antenna(s) of the CBSD. Adjustable antenna parameters include antenna beam width, antenna down tilt, antenna azimuth, and antenna height. An adjustable antenna parameter means an antenna parameter which can be varied, e.g., by remote control by the SAS configured to control transmissions of the CBSD.

Each adjustable antenna parameter is configured to be changed using electrical circuit(s) and/or electromechanical actuator(s). For example, an electrical circuit can include a phase shifter and/or an electronic switch. For example, an electromechanical actuator can include an electrical motor and/or an electromechanical switch. Collectively and individually electrical circuit(s) and/or electromechanical actuator(s) may be referred to herein as at least one electrical circuit and/or at least one electromechanical circuit (or electrical circuit(s) and/or electromechanical circuits(s)). Such electrical circuit(s) and/or electromechanical circuits(s) are configured to alter one or more of the adjustable antenna parameters.

For example, phase shifters coupling antenna elements can be used to adjust antenna beam width, antenna down tilt, and/or antenna azimuth. For example, antenna height may be adjusted by electromechanical actuator, such as with electrical motor(s), that adjusts the height of a mounting structure (e.g., a tower) upon which antenna(s) are mounted. However, alternative techniques can be used to adjust such parameters, e.g., antenna beam width, antenna down tilt, and/or antenna azimuth.

Using the electrical circuit(s) and/or electromechanical circuits(s), a SAS can adjust the antenna parameter(s) of a requesting CBSD in lieu of or in addition to adjusting transmit power of the CBSD to maintain a satisfactory coverage area for the CBSD whilst ensuring that aggregate interference at higher priority user(s) and/or other CBSD(s) controlled by the SAS are less than or equal to each of their corresponding interference threshold level(s). The interference threshold levels for each of higher priority user(s) and secondary user(s) may be determined by law, regulation, and/or rule (e.g., pertaining to CBRS). Optionally, for example, such interference threshold levels may be defined by WInnForum specification. Optionally, for example, the interference threshold levels may vary between a higher priority user and a CBSD, and may vary amongst different types of higher priority users.

A CBRS comprises general authorized access (GAA) and/or priority access license (PAL) CBSDs, and higher priority users. The higher priority users, such as government users for example radar systems, e.g., on ships, have priority access to certain spectrum in the shared spectrum. A SAS grants the CBSDs access to the shared spectrum, including authorizing frequency spectrum (or channels) requested by CBSDs, and authorizing a corresponding requested maximum transmission power or assigning a lower maximum transmission power. A SAS controls the transmission of GAA CBSDs so that PAL CBSDs and the higher priority users are free of interference from GAA CBSDs. The GAA and PAL CBSDs are secondary users; the PAL CBSDs are secondary users because they have lower priority than higher priority users (i.e., incumbent users) such as naval vessels. The SAS also controls the transmission of PAL CBSDs so that higher priority users are free of interference from PAL CBSDs.

Free of interference as used herein does not mean an absence of interference, but rather means an acceptable level of interference which may be no interference or a finite level of interference. The acceptable level of interference may vary by geography, frequency spectrum, user type, license type, and/or other indicia.

GAA CBSDs may be of two types: category A (low transmission power) and category B (high transmission power). Category A has a maximum transmission power spectral density of 30 dBm/10 MHz. Category B has a maximum transmission power spectral density of 47 dBm/10 MHz.

Higher priority users of shared spectrum have first, or highest, priority to utilize the shared spectrum controlled by the SAS. Thus, higher priority users (e.g., the receivers of higher priority users' communications systems or radios) shall be able to operate free of interference from other users, e.g., communications systems of priority access licensees and general authorized access users. In one embodiment, the higher priority users include government entities operating systems such as communications systems, operators of fixed satellite communications systems, and grandfathered, prior licensees of the frequency spectrum. Communications systems, as used herein, shall include radar systems (or radars).

In one embodiment, PAL users have second (or intermediate) priority, after higher priority users (excluding PAL users), to utilize the frequency spectrum controlled by the SAS. In another embodiment, a PAL user shall be able to operate, when higher priority users (excluding PAL users) are free of interference of such a PAL user, and free of interference from other PAL users and general authorized access users. In one embodiment, an ability of a PAL user to operate free of interference shall be limited temporally, geographically, and spectrally within the specifications of its license.

GAA users have third, or lowest, priority to utilize the frequency spectrum controlled by the SAS. In one embodiment, an operation of GAA users will be governed by laws, regulations, and/or rules (e.g., pertaining to CBRS). Such laws, regulations, and/or rules may be established by government(s) and/or standards bodies (e.g., WInnForum). For example, such rules shall only let GAA users' CBSDs operate when they do not interfere with communication systems of higher priority users.

In one embodiment, the geographic coverage area proximate to (e.g., covered by radio frequency emissions of) the CBSD may include exclusion zones and protection regions (including location(s) of fixed satellite service(s) (FSS(s)), priority access license (PAL) protection area(s) (PPA(s)), grandfathered wireless protection zone(s) (GWPZ(s)), dynamic protection area(s) (DPA(s)), and receiver(s) of environmental sensing capability (ESC) system(s)) (or ESC system receiver(s)). CBSDs are prohibited from operating in specific frequency spectrum in exclusion zones. Further, the level of interference generated by, e.g., by all non-government users and even some government users (including higher priority and GAA users) shall be limited in a protection region so as not to interfere with certain incumbent user(s)' communications systems, for example radar on naval vessels, intended to be protected by the protection region. CBSDs may only operate with the permission of the SAS when an incumbent user's communication system is operating in a protection zone. In some cases, this operation will be based upon information received by an environmental sensing capability (ESC) system, from external database(s), notification from an incumbent user, and/or from a beacon. One type of protection region is the grandfathered wireless protection zone which is a geographic area and/or frequency spectrum where grandfathered wireless broadband licensees can operate free of interference, e.g., of CBSDs. The foregoing are examples of exclusion zones and protection regions; other type of exclusion and protection regions may occur.

Although the invention is applicable to and is exemplified in the context of CBRS for pedagogical purposes, it applies to other shared spectrum systems, such as licensed spectrum access systems. For a CBRS, a higher priority user consists of a user consisting of at least one of: at least one incumbent user, at least one ESC system receiver, at least one PAL radio, at least one FSS, and at least one GWPZ. However, more generally, a higher priority user means a receiver of a user, or a region comprising a least one such receiver, where the receiver has a higher priority to receive, in spectrum shared with a secondary radio (or radio), than the radio has to transmit in the share spectrum.

The invention will be subsequently described in more general terms, e.g., using the term radio rather than CBSD, and shared spectrum system rather than CBRS. However, the terms CBRS and CBSD may be subsequently used when illustrating such system and device, or their specifications. Radio means a radio controlled by a spectrum access system. Unless otherwise indicated herein, power as used herein means power or power spectral density.

Figure 1B:
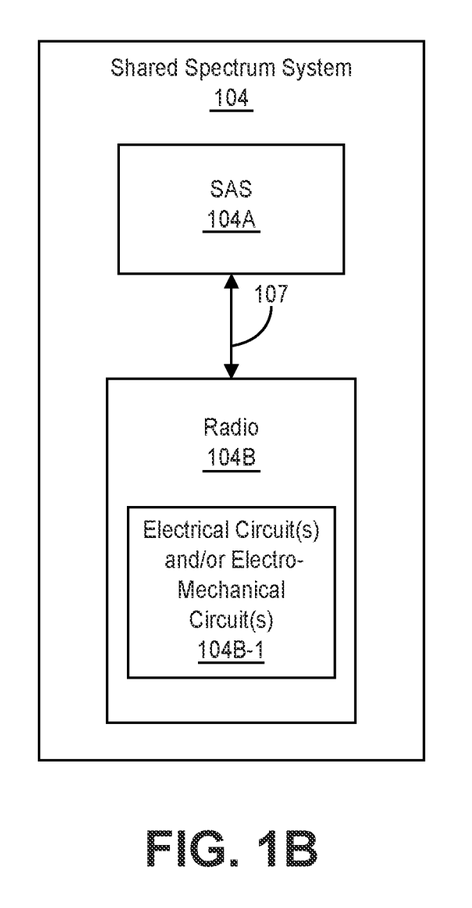
FIG. 1B illustrates a block diagram of one embodiment of a shared spectrum system including a spectrum access system configured to adjust at least one adjustable antenna parameter of at least one radio with at least one adjustable antenna parameter.

FIG. 1B illustrates a block diagram of one embodiment of a shared spectrum system 104 including a spectrum access system 104A configured to adjust at least one adjustable antenna parameter (adjustable antenna parameter(s)) of at least one radio with at least one adjustable antenna parameter. The shared spectrum system 104 comprises the SAS (or SAS circuitry) 104A communicatively coupled, e.g., by a communications link 107, to the at least one radio. The SAS 104A is configured to adjust at least one antenna parameter of at least one of the at least one radio and to adjust a transmit power of the at least one of the at least one radio. In FIG. 1B, SAS 104A is illustrated for pedagogical reasons as being communicatively coupled to a single radio 104B.

Figure 1C:
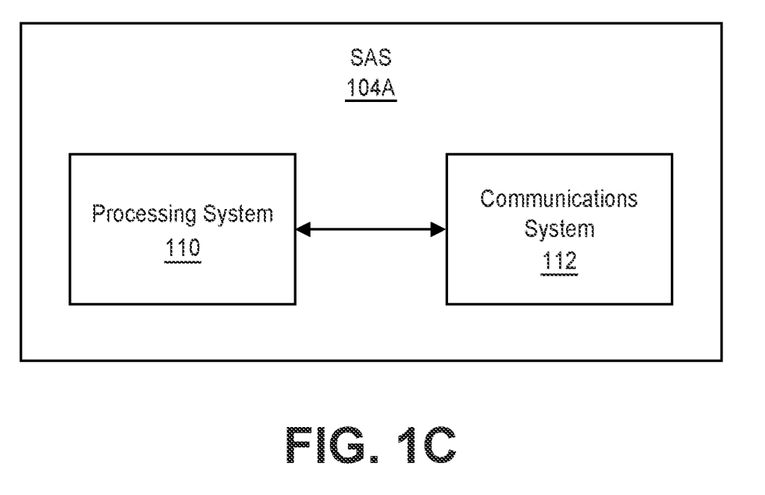
FIG. 1C illustrates a block diagram of one embodiment of a spectrum access system configured to adjust at least one antenna parameter and a transmit power of at least one radio.

FIG. 1C illustrates a block diagram of one embodiment of a SAS 104A configured to adjust at least one antenna parameter and to adjust a transmit power of at least one radio. The SAS 104A comprises a processing system (or processing circuitry) 110; optionally, the processing system 110 is communicatively coupled to an optional communications system (or communications circuitry) 112. The processing system 110 may be implemented with a state machine and/or a neural network. When implemented as a state machine, the processing system 110 may optionally include processor circuitry coupled to memory circuitry. Optionally, the subsequently illustrated methods may be stored and/or executed in the SAS 104A, e.g., by the processing system 110. Optionally, the subsequently illustrated methods may be stored in the memory circuitry and executed by the processor circuitry. Optionally, the communications system 112 may include an Ethernet transceiver and/or a modem.

Returning to FIG. 1B, for pedagogical purposes, the at least one radio is illustrated as a single radio 104B having at least one adjustable antenna parameter and a transmit power configured to be adjusted by the SAS 104A. The radio comprises electrical circuit(s) and/or electromechanical circuit(s) 104B-1; the SAS 104A is configured to control the electrical circuit(s) and/or electromechanical circuit(s) 104B-1 to adjust at least one antenna parameter.

A shared spectrum system 104 may include more than one radio whose transmissions are configured to be controlled by the SAS 104A. Optionally, the transmit power of each of such more than one radio is configured to be controlled by the SAS 104A. Each radio includes a transmitter or a transceiver and one or more antennas (antenna(s)) coupled thereto.

One or more of the radios of the shared spectrum system 104 may each comprise electrical circuit(s) and/or electromechanical circuits(s). Each radio of the one or more of the radios may include the same number of and type of electrical circuit(s) and/or electromechanical circuits(s) as are included in other radios of the one or more of the radios; alternatively, one or more of the radios may including a different number of and/or different type(s) of electrical circuit(s) and/or electromechanical circuits(s). Each of the electrical circuit or electromechanical circuits of a radio is configured to adjust at least one adjustable antenna parameter of the radio alone or in conjunction with at least one other electrical circuit and/or at least one other electromechanical circuit.

Figure 2:
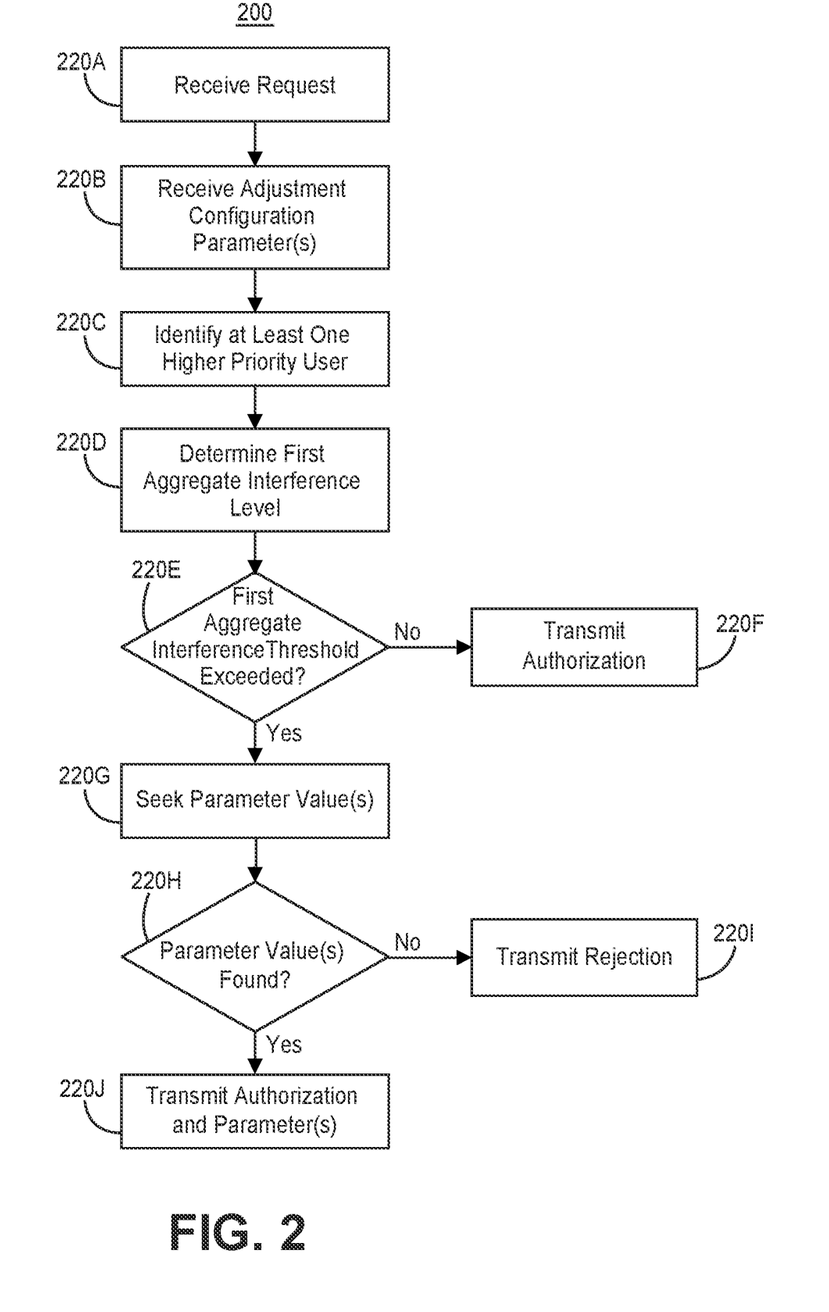
FIG. 2 illustrates a flow diagram of one embodiment of a method of adjusting coverage of area of a radio controlled by a spectrum access system to reduce interference, in shared spectrum, to at least one higher priority user and/or to at least one other radio.

FIG. 2 illustrates a flow diagram of one embodiment of a method 200 of adjusting coverage of area of a radio controlled by a spectrum access system to reduce interference, in shared spectrum, to at least one higher priority user and/or to at least one other radio. To the extent that the method 200 shown in FIG. 2 is described herein as being implemented with any of the systems illustrated herein, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the FIG. 2) can occur in a different order (for example, where at least some of the processing associated with the blocks is performed in parallel and/or in an event-driven manner). The illustrated method may be executed by the SAS and/or another processing system. The method 200 may be used when a radio submits a request to utilize spectrum controlled by a SAS and shared with higher priority user(s) and/or radio(s) whose transmissions are controlled by the SAS.

In block 220A, receive a request from a radio to utilize spectrum shared with at least one higher priority user. The higher priority user must be free of interference from the requesting radio. Optionally, the request is received by a SAS. Optionally, the shared spectrum may be shared with at least one other radio. Requesting radio means the radio making the request. Optionally, the request identifies shared spectrum in which the radio would like to operate, e.g., transmit. Optionally, the request also identifies the power level at which the radio would like to transmit in the shared spectrum.

Optionally, in block 220B, receive at least one adjustment configuration parameter (or adjustment configuration parameter(s)) of the requesting radio. The adjustment configuration parameter(s) specify a range(s) of the adjustable antenna parameter(s) (and optionally the radio transmission power) configured to be adjustable. For example, the adjustment configuration parameters can including a maximum down tilt, a range of azimuthal angles, a minimum transmission power level (or a minimum and maximum transmission power levels), a minimum beam width (or a minimum and a maximum beam widths), and/or a minimum antenna height (or a minimum and a maximum antenna heights). Optionally, the at least one adjustment configuration parameter includes an incrementation step may be provided for at least one parameter whose value is sought in block 220G. Optionally, such adjustment configuration parameters may be provided by the radio when making the request in block 220A, stored in the SAS, and/or provided by a third party, e.g., a third party database that may include specifications for radio(s) controlled by the SAS (including for each radio's corresponding antenna(s)). Optionally, the adjustment configuration parameters may also include a user equipment threshold level, and/or at least one specific region as described elsewhere herein.

In block 220C, identify at least one higher priority user, where each identified higher priority user has a region of interest within which the requesting radio is located. Optionally, identify at least one other radio transmitting in the shared spectrum; optionally the at least one other radio's transmissions are controlled by the SAS.

In block 220D, determine a first aggregate interference power or power spectral density (or first aggregate interference level) at each identified higher priority user. For purposes of clarity, only one type of higher priority user may be identified in block 220C. Optionally, determine the first aggregate interference power or power spectral density at each identified other radio. The first aggregate interference power or power spectral density comprises a sum of interference powers or power spectral densities at a corresponding higher priority user from the requesting radio and any other radio authorized to transmit in the shared spectrum within the region of interest of the corresponding identified higher priority user or identified other radio. The interference power or power spectral density of each radio at an identified higher priority user may be modelled with a propagation model described herein using parameter(s) of the corresponding radio (e.g., transmit power and optionally one or more parameters of antenna(s) of the radio), and optionally parameters of terrain morphology through which transmitted signals propagate. For example, modelling techniques specified by WInnForum standard WINNF-TS-0112 (incorporated by reference in its entirety herein) can be used. Also, for example, the higher priority user can be static and at a fixed location such as a fixed satellite service and/or at a grandfathered wireless protection zone. Further, for example, the radio may be a secondary user that is a priority access licensee and not a general authorized user.

Optionally, the region of interest of a higher priority user may be a circle whose radius is defined by a law, regulation, or industry standard. The shape and dimensions of the region of interest may differ for a higher priority user versus a radio.

In block 220E, determine if the first aggregate interference power or power spectral density level, at any identified higher priority user, exceeds a corresponding interference threshold level. Optionally, determine if the first aggregate interference power or power spectral density level, at any identified other radio, exceeds a corresponding interference threshold level. The interference threshold levels for radios and different types of higher priority users may be defined by law, regulation, or industry standard. If the first aggregate interference power or power spectral density level does not exceed the interference threshold level at any identified higher priority user (and optionally also at any identified other radio), then, then in block 220F, transmit authorization to the requesting radio to transmit in the shared spectrum, and optionally transmit a corresponding authorized power level which may be a requested transmit power level or a lower transmit power level determined according to a process, e.g., specified by WInnForum standard WINNF-TS-0112.

If the first aggregate interference power, or power spectral density, level exceeds the interference threshold level at any identified higher priority user (or optionally at any identified other radio), then, then in block 220G, seek value(s) of at least one adjustable antenna parameter, and optionally of a transmit power, of the requesting radio so that a coverage area, e.g. a reduced coverage area, of the requesting radio includes at least one of: (a) a number of user equipment configured to communicate with the radio that is greater than a user equipment threshold level, and (b) at least one specific area, while another aggregate interference power, or power spectral density, level, at any identified higher priority user, does not exceed a corresponding interference threshold level. Each other aggregate interference power, or power spectral density, level is determined using a combination of discrete values of each of the at least one adjustable antenna parameter and the transmit power level for the requesting radio. The coverage area of the requesting radio and the interference contribution at identified higher priority user(s) are determined with the same combination of value(s) of at least one adjustable antenna parameter, and optionally of a transmit power.

Optionally, and for example only, this may be done by determining the interference at each such location for a set of all possible combinations of discrete values of each of the at least one adjustable antenna parameter and the transmit power level for the requesting radio, e.g., where the discrete values of a parameter are separated by a corresponding incrementation step. Optionally, block 220G may be implemented using an iterative optimization algorithm which determines a reduced coverage area (of the requesting radio) for each combination of parameter values of each of the at least one adjustable antenna parameter (and optionally radio transmit power) of the requesting radio, and selects a combination that results in a lowest aggregate interference (or a lowest average of aggregate) at each identified higher priority user while the reduced coverage area includes at least one of: (a) a number of user equipment greater than the corresponding user equipment threshold level, and (b) at least one specific area. The optimization algorithm may be a brute force global search algorithm. The optimization algorithm attempts to diminish aggregate interference level at each identified higher priority user so the aggregate interference level at each identified higher priority user is equal to or less than a corresponding threshold level for each identified higher priority user, while satisfying the reduced coverage area of the requesting radio discussed herein.

In block 220H, determine if the parameter value(s) sought in block 220G were found. If the parameter value(s) sought in block 220G where not found, then in block 220I, transmit a rejection of the request, to transmit in the shared spectrum, to the requesting radio. If the parameter values sought in block 220G were found, then in block 220J, transmit to the requesting radio: (a) authorization to use the requested frequency, and (b) the found sought value of the at least one antenna parameter, and optionally a value of an authorized transmit power level which may be a requested transmit power level, or a lower transmit power level determined according to a process, e.g., specified by WInnForum standard WINNF-TS-0112 or by block 220G. Of determined by block 220G, the transmit power level may be referred to as the found sought transmit power level.

The processor circuitry described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium that is part of (optionally the memory circuitry) or communicatively coupled to the processing circuitry, and executed by the processing circuitry, optionally the processor circuitry. Generally, program modules or applications include routines, programs, objects, data components, data structures, algorithms, and the like, which perform particular tasks or implement particular abstract data types.

Databases as used herein may be either conventional databases or data storage formats of any type, e.g., data files.

Although separate databases are recited herein, one or more of such databases may be combined.

Exemplary Embodiments

Example 1 includes a program product comprising a non-transitory processor readable medium on which program instructions are embodied, wherein the program instructions are configured, when executed by at least one programmable processor, to cause the at least one programmable processor to: receive a request from a radio to utilize spectrum shared with at least one higher priority user, where the at least one higher priority user has priority to receive in the shared spectrum over the requesting radio to transmit in the shared spectrum; identify at least one higher priority user having a region of interest within which the requesting radio is located; determine a first aggregate interference power, or power spectral density, level at each identified higher priority user, wherein the first aggregate interference power, or power spectral density, level comprises a sum of interference power, or power spectral density, levels at a corresponding identified higher priority user from the requesting radio and any other radio authorized to transmit in the shared spectrum within the region of interest of the corresponding identified higher priority user; determine if the first aggregate interference power, or power spectral density, level, at any identified higher priority user, exceeds a corresponding interference threshold level; upon determining that the first aggregate interference power, or power spectral density, level at any identified higher priority user exceeds the corresponding interference threshold level, then seek a value of at least one adjustable antenna parameter of the requesting radio so that a reduced coverage area of the requesting radio includes at least one of: (a) a number of user equipment configured to communicate with the radio that is greater than a user equipment threshold level, and (b) at least one specific area, while a corresponding other aggregate interference power, or power spectral density, level, at any identified higher priority user, does not exceed the corresponding interference threshold level, wherein the corresponding other aggregate interference power, or power spectral density, level comprises a sum of interference power, or power spectral density, levels at a corresponding identified higher priority user from the requesting radio and any other radio authorized to transmit in the shared spectrum and within the region of interest of the corresponding identified higher priority user, and wherein a coverage area is an electromagnetic radiation pattern of the requesting radio which has a power, or power spectral density, level at or above a level that is a minimum detectable level of a receiver of an user equipment; and upon finding a sought value of the at least one adjustable antenna parameter of the requesting radio, then transmit to the requesting radio an authorization to transmit in the shared spectrum and the found sought value of the at least one adjusted adjustable antenna parameter.

Example 2 includes the program product of Example 1, wherein seek the value of the at least one adjustable antenna parameter further comprises seek a value of a transmit power, or power spectral density, level of the requesting radio.

Example 3 includes the program product of Example 2, wherein transmit to the requesting radio further comprises transmit a found sought value of the transmit power, or power spectral density, level of the requesting radio.

Example 4 includes the program product of any of Examples 1-3, wherein the program instructions are configured, when executed by the at least one programmable processor, to further cause the at least one programmable processor to: receive at least one adjustment configuration parameter of the requesting radio, wherein the at least one adjustment configuration parameter comprises at least one range of an adjustable antenna parameter of the requesting radio.

Example 5 includes the program product of any of Examples 1-4, wherein the program instructions are configured, when executed by the at least one programmable processor, to further cause the at least one programmable processor to, upon determining that the first aggregate interference power, or power spectral density, level does not exceed the corresponding interference threshold level at any identified incumbent user, then transmit to the requesting radio the authorization to transmit in the shared spectrum.

Example 6 includes the program product of any of Examples 1-5, wherein the program instructions are configured, when executed by the at least one programmable processor, to further cause the at least one programmable processor to, upon not finding the sought value of the at least one adjustable antenna parameter of the requesting radio, then transmit a rejection of the request, to transmit in the shared spectrum, to the requesting radio.

Example 7 includes a method, comprising: receiving a request from a radio to utilize spectrum shared with at least one higher priority user, where the at least one higher priority user has priority to receive in the shared spectrum over the requesting radio to transmit in the shared spectrum; identifying at least one higher priority user having a region of interest within which the requesting radio is located; determining a first aggregate interference power, or power spectral density, level at each identified higher priority user, wherein the first aggregate interference power, or power spectral density, level comprises a sum of interference power, or power spectral density, levels at a corresponding identified higher priority user from the requesting radio and any other radio authorized to transmit in the shared spectrum within the region of interest of the corresponding identified higher priority user; determining if the first aggregate interference power, or power spectral density, level, at any identified higher priority user, exceeds a corresponding interference threshold level; upon determining that the first aggregate interference power, or power spectral density, level at any identified higher priority user exceeds the corresponding interference threshold level, then seeking a value of at least one adjustable antenna parameter of the requesting radio so that a reduced coverage area of the requesting radio includes at least one of: (a) a number of user equipment configured to communicate with the radio that is greater than a user equipment threshold level, and (b) at least one specific area, while a corresponding other aggregate interference power, or power spectral density, level, at any identified higher priority user, does not exceed the corresponding interference threshold level, wherein the corresponding other aggregate interference power, or power spectral density, level comprises a sum of interference power, or power spectral density, levels at a corresponding identified higher priority user from the requesting radio and any other radio authorized to transmit in the shared spectrum and within the region of interest of the corresponding identified higher priority user, and wherein a coverage area is an electromagnetic radiation pattern of the requesting radio which has a power, or power spectral density, level at or above a level that is a minimum detectable level of a receiver of an user equipment; and upon finding a sought value of the at least one adjustable antenna parameter of the requesting radio, then transmitting to the requesting radio an authorization to transmit in the shared spectrum and the found sought value of the at least one adjusted adjustable antenna parameter.

Example 8 includes the method of Example 7, wherein seeking the value of the at least one adjustable antenna parameter further comprises seek a value of a transmit power, or power spectral density, level of the requesting radio.

Example 9 includes the method of Example 8, wherein transmitting to the requesting radio further comprises transmitting a found sought value of the transmit power, or power spectral density, level of the requesting radio.

Example 10 includes the method of any of Examples 7-9, further comprising: receiving at least one adjustment configuration parameter of the requesting radio, wherein the at least one adjustment configuration parameter comprises at least one range of an adjustable antenna parameter of the requesting radio.

Example 11 includes the method of any of Examples 7-10, further comprising, upon determining that the first aggregate interference power, or power spectral density, level does not exceed the corresponding interference threshold level at any identified incumbent user, then transmitting to the requesting radio the authorization to transmit in the shared spectrum.

Example 12 includes the method of any of Examples 7-11, further comprising, upon not finding the sought value of the at least one adjustable antenna parameter of the requesting radio, then transmitting a rejection of the request, to transmit in the shared spectrum, to the requesting radio.

Example 13 includes a spectrum access system, comprising: processing circuitry configured to: receive a request from a radio to utilize spectrum shared with at least one higher priority user, where the at least one higher priority user has priority to receive in the shared spectrum over the requesting radio to transmit in the shared spectrum; identify at least one higher priority user having a region of interest within which the requesting radio is located; determine a first aggregate interference power, or power spectral density, level at each identified higher priority user, wherein the first aggregate interference power, or power spectral density, level comprises a sum of interference power, or power spectral density, levels at a corresponding identified higher priority user from the requesting radio and any other radio authorized to transmit in the shared spectrum within the region of interest of the corresponding identified higher priority user; determine if the first aggregate interference power, or power spectral density, level, at any identified higher priority user, exceeds a corresponding interference threshold level; upon determining that the first aggregate interference power, or power spectral density, level at any identified higher priority user exceeds the corresponding interference threshold level, then seek a value of at least one adjustable antenna parameter of the requesting radio so that a reduced coverage area of the requesting radio includes at least one of: (a) a number of user equipment configured to communicate with the radio that is greater than a user equipment threshold level, and (b) at least one specific area, while a corresponding other aggregate interference power, or power spectral density, level, at any identified higher priority user, does not exceed the corresponding interference threshold level, wherein the corresponding other aggregate interference power, or power spectral density, level comprises a sum of interference power, or power spectral density, levels at a corresponding identified higher priority user from the requesting radio and any other radio authorized to transmit in the shared spectrum and within the region of interest of the corresponding identified higher priority user, and wherein a coverage area is an electromagnetic radiation pattern of the requesting radio which has a power, or power spectral density, level at or above a level that is a minimum detectable level of a receiver of an user equipment; and upon finding a sought value of the at least one adjustable antenna parameter of the requesting radio, then transmit to the requesting radio an authorization to transmit in the shared spectrum and the found sought value of at least adjustable antenna parameter.

Example 14 includes the spectrum access system of Example 13, wherein seek the value of the at least one adjustable antenna parameter further comprises seek a value of a transmit power, or power spectral density, level of the requesting radio.

Example 15 includes the spectrum access system of Example 14, wherein transmit to the requesting radio further comprises transmit a found sought value of the transmit power, or power spectral density, level of the requesting radio.

Example 16 includes the spectrum access system of any of Examples 13-15, wherein the processing circuitry is further configured to: receive at least one adjustment configuration parameter of the requesting radio, wherein the at least one adjustment configuration parameter comprises at least one range of an adjustable antenna parameter of the requesting radio.

Example 17 includes the spectrum access system of any of Examples 13-16, wherein the processing circuitry is further configured to: upon determining that the first aggregate interference power, or power spectral density, level does not exceed the corresponding interference threshold level at any identified incumbent user, then transmit to the requesting radio the authorization to transmit in the shared spectrum.

Example 18 includes the spectrum access system of any of Examples 13-17, wherein the processing circuitry is further configured to: upon not finding the sought value of the at least one adjustable antenna parameter of the requesting radio, then transmit a rejection of the request, to transmit in the shared spectrum, to the requesting radio.

Example 19 includes the spectrum access system of any of Examples 13-18, wherein the processing circuitry comprises processor circuitry coupled to memory circuitry.

Example 20 includes the spectrum access system of any of Examples 13-19, further comprising communications circuitry configured to be coupled to the processing circuitry and the requesting radio.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A program product comprising a non-transitory processor readable medium on which program instructions are embodied, wherein the program instructions are configured, when executed by at least one programmable processor, to cause the at least one programmable processor to:
receive a request from a radio to utilize spectrum shared with at least one higher priority user, where the at least one higher priority user has priority to receive in the shared spectrum over the requesting radio to transmit in the shared spectrum;

identify at least one higher priority user having a region of interest within which the requesting radio is located;

determine a first aggregate interference power, or power spectral density, level at each identified higher priority user, wherein the first aggregate interference power, or power spectral density, level comprises a sum of interference power, or power spectral density, levels at a corresponding identified higher priority user from the requesting radio and any other radio authorized to transmit in the shared spectrum within the region of interest of the corresponding identified higher priority user;

determine if the first aggregate interference power, or power spectral density, level, at any identified higher priority user, exceeds a corresponding interference threshold level;

upon determining that the first aggregate interference power, or power spectral density, level at any identified higher priority user exceeds the corresponding interference threshold level, then seek a value of at least one adjustable antenna parameter of the requesting radio so that a reduced coverage area of the requesting radio includes at least one of: (a) a number of user equipment configured to communicate with the radio that is greater than a user equipment threshold level, and (b) at least one specific area, while a corresponding other aggregate interference power, or power spectral density, level, at any identified higher priority user, does not exceed the corresponding interference threshold level, wherein the corresponding other aggregate interference power, or power spectral density, level comprises a sum of interference power, or power spectral density, levels at a corresponding identified higher priority user from the requesting radio and any other radio authorized to transmit in the shared spectrum and within the region of interest of the corresponding identified higher priority user, and wherein a coverage area is an electromagnetic radiation pattern of the requesting radio which has a power, or power spectral density, level at or above a level that is a minimum detectable level of a receiver of an user equipment; and upon finding a sought value of the at least one adjustable antenna parameter of the requesting radio, then transmit to the requesting radio an authorization to transmit in the shared spectrum and the found sought value of the at least one adjusted adjustable antenna parameter.

2. The program product of claim 1, wherein seek the value of the at least one adjustable antenna parameter further comprises seek a value of a transmit power, or power spectral density, level of the requesting radio.

3. The program product of claim 2, wherein transmit to the requesting radio further comprises transmit a found sought value of the transmit power, or power spectral density, level of the requesting radio.

4. The program product of claim 1, wherein the program instructions are configured, when executed by the at least one programmable processor, to further cause the at least one programmable processor to: receive at least one adjustment configuration parameter of the requesting radio, wherein the at least one adjustment configuration parameter comprises at least one range of an adjustable antenna parameter of the requesting radio.

5. The program product of claim 1, wherein the program instructions are configured, when executed by the at least one programmable processor, to further cause the at least one programmable processor to, upon determining that the first aggregate interference power, or power spectral density, level does not exceed the corresponding interference threshold level at any identified incumbent user, then transmit to the requesting radio the authorization to transmit in the shared spectrum.

6. The program product of claim 1, wherein the program instructions are configured, when executed by the at least one programmable processor, to further cause the at least one programmable processor to, upon not finding the sought value of the at least one adjustable antenna parameter of the requesting radio, then transmit a rejection of the request, to transmit in the shared spectrum, to the requesting radio.

7. A method, comprising:

receiving a request from a radio to utilize spectrum shared with at least one higher priority user, where the at least one higher priority user has priority to receive in the shared spectrum over the requesting radio to transmit in the shared spectrum;

identifying at least one higher priority user having a region of interest within which the requesting radio is located;

determining a first aggregate interference power, or power spectral density, level at each identified higher priority user, wherein the first aggregate interference power, or power spectral density, level comprises a sum of interference power, or power spectral density, levels at a corresponding identified higher priority user from the requesting radio and any other radio authorized to transmit in the shared spectrum within the region of interest of the corresponding identified higher priority user;

determining if the first aggregate interference power, or power spectral density, level, at any identified higher priority user, exceeds a corresponding interference threshold level;

upon determining that the first aggregate interference power, or power spectral density, level at any identified higher priority user exceeds the corresponding interference threshold level, then seeking a value of at least one adjustable antenna parameter of the requesting radio so that a reduced coverage area of the requesting radio includes at least one of: (a) a number of user equipment configured to communicate with the radio that is greater than a user equipment threshold level, and (b) at least one specific area, while a corresponding other aggregate interference power, or power spectral density, level, at any identified higher priority user, does not exceed the corresponding interference threshold level, wherein the corresponding other aggregate interference power, or power spectral density, level comprises a sum of interference power, or power spectral density, levels at a corresponding identified higher priority user from the requesting radio and any other radio authorized to transmit in the shared spectrum and within the region of interest of the corresponding identified higher priority user, and wherein a coverage area is an electromagnetic radiation pattern of the requesting radio which has a power, or power spectral density, level at or above a level that is a minimum detectable level of a receiver of an user equipment; and upon finding a sought value of the at least one adjustable antenna parameter of the requesting radio, then transmitting to the requesting radio an authorization to transmit in the shared spectrum and the found sought value of the at least one adjusted adjustable antenna parameter.

8. The method of claim 7, wherein seeking the value of the at least one adjustable antenna parameter further comprises seek a value of a transmit power, or power spectral density, level of the requesting radio.

9. The method of claim 8, wherein transmitting to the requesting radio further comprises transmitting a found sought value of the transmit power, or power spectral density, level of the requesting radio.

10. The method of claim 7, further comprising: receiving at least one adjustment configuration parameter of the requesting radio, wherein the at least one adjustment configuration parameter comprises at least one range of an adjustable antenna parameter of the requesting radio.

11. The method of claim 7, further comprising, upon determining that the first aggregate interference power, or power spectral density, level does not exceed the corresponding interference threshold level at any identified incumbent user, then transmitting to the requesting radio the authorization to transmit in the shared spectrum.

12. The method of claim 7, further comprising, upon not finding the sought value of the at least one adjustable antenna parameter of the requesting radio, then transmitting a rejection of the request, to transmit in the shared spectrum, to the requesting radio.

13. A spectrum access system, comprising:
processing circuitry configured to:
receive a request from a radio to utilize spectrum shared with at least one higher priority user, where the at least one higher priority user has priority to receive in the shared spectrum over the requesting radio to transmit in the shared spectrum;
identify at least one higher priority user having a region of interest within which the requesting radio is located;
determine a first aggregate interference power, or power spectral density, level at each identified higher priority user, wherein the first aggregate interference power, or power spectral density, level comprises a sum of interference power, or power spectral density, levels at a corresponding identified higher priority user from the requesting radio and any other radio authorized to transmit in the shared spectrum within the region of interest of the corresponding identified higher priority user;
determine if the first aggregate interference power, or power spectral density, level, at any identified higher priority user, exceeds a corresponding interference threshold level;
upon determining that the first aggregate interference power, or power spectral density, level at any identified higher priority user exceeds the corresponding interference threshold level, then seek a value of at least one adjustable antenna parameter of the requesting radio so that a reduced coverage area of the requesting radio includes at least one of: (a) a number of user equipment configured to communicate with the radio that is greater than a user equipment threshold level, and (b) at least one specific area, while a corresponding other aggregate interference power, or power spectral density, level, at any identified higher priority user, does not exceed the corresponding interference threshold level, wherein the corresponding other aggregate interference power, or power spectral density, level comprises a sum of interference power, or power spectral density, levels at a corresponding identified higher priority user from the requesting radio and any other radio authorized to transmit in the shared spectrum and within the region of interest of the corresponding identified higher priority user, and wherein a coverage area is an electromagnetic radiation pattern of the requesting radio which has a power, or power spectral density, level at or above a level that is a minimum detectable level of a receiver of an user equipment; and
upon finding a sought value of the at least one adjustable antenna parameter of the requesting radio, then transmit to the requesting radio an authorization to transmit in the shared spectrum and the found sought value of at least adjustable antenna parameter.

14. The spectrum access system of claim 13, wherein seek the value of the at least one adjustable antenna parameter further comprises seek a value of a transmit power, or power spectral density, level of the requesting radio.

15. The spectrum access system of claim 14, wherein transmit to the requesting radio further comprises transmit a found sought value of the transmit power, or power spectral density, level of the requesting radio.

16. The spectrum access system of claim 13, wherein the processing circuitry is further configured to: receive at least one adjustment configuration parameter of the requesting radio, wherein the at least one adjustment configuration parameter comprises at least one range of an adjustable antenna parameter of the requesting radio.

17. The spectrum access system of claim 13, wherein the processing circuitry is further configured to: upon determining that the first aggregate interference power, or power spectral density, level does not exceed the corresponding interference threshold level at any identified incumbent user, then transmit to the requesting radio the authorization to transmit in the shared spectrum.

18. The spectrum access system of claim 13, wherein the processing circuitry is further configured to: upon not finding the sought value of the at least one adjustable antenna parameter of the requesting radio, then transmit a rejection of the request, to transmit in the shared spectrum, to the requesting radio.

19. The spectrum access system of claim 13, wherein the processing circuitry comprises processor circuitry coupled to memory circuitry.

20. The spectrum access system of claim 13, further comprising communications circuitry configured to be coupled to the processing circuitry and the requesting radio.

* * * * *